Sept. 30, 1969  H. SCHAFER  3,470,344
HELICAL-SEAM RESISTANCE TUBE WELDING APPARATUS
Filed Feb. 13, 1967
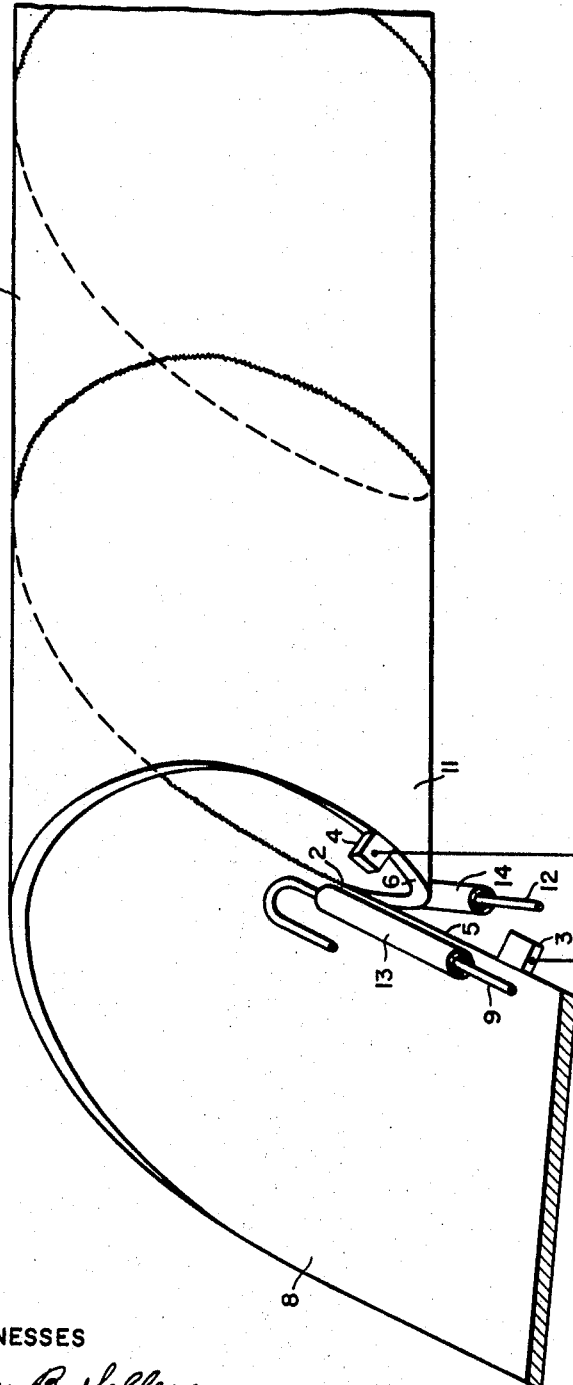
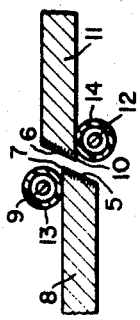
WITNESSES
Wm. B. Sellers.
Levi M. Garman
INVENTOR
Hans Schafer
BY
AGENT

United States Patent Office 3,470,344
Patented Sept. 30, 1969

3,470,344
HELICAL-SEAM RESISTANCE TUBE WELDING APPARATUS
Hans Schafer, Erlangen, Germany, assignor to Siemens Aktiengesellschaft, Berlin, Germany, a corporation of Germany
Filed Feb. 13, 1967, Ser. No. 615,821
Claims priority, application Germany, Mar. 29, 1966, S 102,838
Int. Cl. B23k 1/16, 11/08
U.S. Cl. 219—62
2 Claims

ABSTRACT OF THE DISCLOSURE

In helical or spiral seam welding apparatus where high frequency heating current is caused to flow from one sliding contact along one edge of a tangentially-approaching metal strip, through a weld point where such edge contacts the adjacent edge of the tube into which such strip is being wound, and along such tube edge to another sliding contact; a pair of ferromagnetic rods, located in the vicinity of the approaching edges, one of the rods being located along the inner surface of the strip parallel to its heated edge, and the other being located outside the tube tangential to its heated edge.

BACKGROUND OF THE INVENTION

Field of the invention

Helical-seam tube welding apparatus using resistance heating and ferromagnetic elements for controlling distribution of heating current along the edges being joined to form the welded seam.

Description of the prior art

In prior art employment of resistance heating in helical-seam welding, the distribution of the heating current thicknesswise of the metal strip tends to be non-uniform. An incandescent image (heat distribution picture) shows that the inside edge of the incoming strip is more strongly heated than the outside edge, and that, in the case of the wound strip, the outside edge of the tubular body is more strongly heated than the inside edge. In order to prevent lack of uniformity in the heating, provision must be made for a wide heating zone by having a correspondingly low rate of travel. This gives rise to large mechanical stresses on cooling down.

SUMMARY OF THE INVENTION

The objective of the invention is to ensure the uniform heating of the adjacent strip and tube edges. This objective is attained by locating ferromagnetic rods close to the point where converging edges make contact, one of the said rods lying above the inside edge of the incoming strip and parallel to it, the other rod lying above the outside edge of the revolving strip and lying tangential to the edge. The ferromagnetic rods cause the electrical current heating the edges of the strip to become uniformly distributed.

BRIEF DESCRIPTION OF THE DRAWING

FIG. 1 shows a spirally seam-welded tube during its manufacture.

FIG. 2 shows the incandescence picture (heat distribution) of the contiguous edges obtained without using the techniques forming the basis of the invention.

FIG. 3 shows the heat distribution when using ferromagnetic rods.

DESCRIPTION OF THE PREFERRED EMBODIMENT

FIG. 1 shows the manufacture of spirally seam-welded tube 1 in sufficient detail for understanding the basis of the invention. A strip is spirally wound into the form of a tube by means of rollers (not shown). The contiguous edges of the wound strip are seam welded at the point 2. To this end, high-frequency alternating current is fed in via sliding contacts 3 and 4. It is also possible to produce the required heating current by means of an inductor. In order to ensure that the contiguous edges 5 and 6 which are to be welded together are uniformly heated, a ferromagnetic rod 9 is placed above and parallel to inside surface 7 near the edge 5 of fed-in strip 8, as shown on an enlarged scale in FIG. 3 and, in addition, ferromagnetic rod 12 is placed above outside surface 10 of rotating strip 11 near the edge 6 and aligned tangential to said surface 10. The ferromagnetic rods are water-cooled, a coaxial sleeve 13 or 14 of fiber-glass or mica being provided for circulating cooling water, the said sleeves or conduits being non-magnetic.

FIG. 2 shows the heating pattern obtained without using ferromagnetic rods while FIG. 3 shows the heating pattern with ferromagnetic rods. A comparison of the two patterns shows that, by employing the methods forming the invention, the edges of the strip to be welded are uniformly heated.

What is claimed is:
1. In apparatus for manufacturing spiral seam-welded tubing where high-frequency heating current is caused to flow along the edges of a tangentially-approaching metal strip and a rotating axially-moving tube into which such strip is being wound, via the point of contact of such edges, wherein the improvement comprises ferromagnetic members located in the vicinity of such point of contact and parallel to such edges, one of said members being located above the inner surface of the strip and disposed parallel to such inner surface, and the other of said members being located above the outer surface of the rotating tube and disposed tangentially to such outer surface.

2. The improved apparatus of claim 1, further comprising non-magnetic conduits encasing at least portions of said ferromagnetic members, respectively, for conveying cooling water thereto.

References Cited

UNITED STATES PATENTS 2,833,910   5/1958   Stanton et al. _____ 219—59
3,209,116   9/1965   Rudd _____ 219—59

JOSEPH V. TRUHE, Primary Examiner
B. A. STEIN, Assistant Examiner